(12) United States Patent
Shatzkamer et al.

(10) Patent No.: US 8,902,815 B2
(45) Date of Patent: Dec. 2, 2014

(54) SYSTEM AND METHOD FOR SUBSCRIBER MOBILITY IN A CABLE NETWORK ENVIRONMENT

(75) Inventors: Kevin D. Shatzkamer, Hingham, MA (US); Eric Hamel, Paris (FR); Rajesh S. Pazhyannur, Milpitas, CA (US); David E. Dukinfield, Round Hill, VA (US); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 13/179,537

(22) Filed: Jul. 10, 2011

(65) Prior Publication Data

US 2013/0010686 A1    Jan. 10, 2013

(51) Int. Cl.
| | |
|---|---|
| H04W 4/00 | (2009.01) |
| H04B 7/212 | (2006.01) |
| H04H 20/67 | (2008.01) |
| H04W 40/00 | (2009.01) |

(52) U.S. Cl.
CPC .................................... *H04W 40/00* (2013.01)
USPC ........... 370/328; 370/338; 370/337; 370/339; 370/329

(58) Field of Classification Search
CPC ..................................................... H04W 88/06
USPC .......................................... 370/328, 329, 330
See application file for complete search history.

(56) References Cited

U.S. PATENT DOCUMENTS

| | | |
|---|---|---|
| 6,822,940 B1 | 11/2004 | Zavalkovsky et al. |
| 6,889,050 B1 | 5/2005 | Willars et al. |
| 7,215,667 B1 | 5/2007 | Davis |
| 8,000,242 B2 | 8/2011 | Wang et al. |
| 8,254,382 B1* | 8/2012 | Wu et al. ........................ 370/389 |
| 8,355,413 B2 | 1/2013 | Vasamsetti et al. |
| 8,358,593 B2 | 1/2013 | Eipe et al. |
| 8,391,152 B2 | 3/2013 | Briscoe et al. |
| 8,493,860 B2 | 7/2013 | Racz et al. |
| 2003/0058862 A1* | 3/2003 | Lansing et al. ............... 370/392 |
| 2003/0103458 A1 | 6/2003 | Shin |
| 2004/0052212 A1 | 3/2004 | Baillargeon |
| 2004/0114519 A1 | 6/2004 | MacIsaac |
| 2005/0041584 A1 | 2/2005 | Leu et al. |
| 2005/0138418 A1 | 6/2005 | Spry et al. |
| 2005/0159167 A1 | 7/2005 | Hakalin et al. |
| 2006/0159016 A1 | 7/2006 | Sagfors et al. |
| 2007/0064684 A1 | 3/2007 | Kottilingal |

(Continued)

OTHER PUBLICATIONS

U.S. Appl. No. 14/058,732, filed Oct. 21, 2013, entitled "System and Method for Managing Tracking Area Identity Lists in a Mobile Network Environment," Inventors: Vinod K. Kamalaraj, et al.

(Continued)

*Primary Examiner* — Brandon Renner
*Assistant Examiner* — Abdelnabi Musa
(74) *Attorney, Agent, or Firm* — Patent Capital Group (57) ABSTRACT

A method is provided in one example embodiment and includes creating a service flow with an endpoint over a wireless link coupled to a backhaul; notifying a mobility anchor of a location associated with the endpoint; relaying control packets between the endpoint and an access gateway; and relaying bearer packets between the endpoint and the mobility anchor, where the bearer packets are exchanged with the endpoint over a locally terminated bearer tunnel and the bearer packets are exchanged with the mobility anchor using Proxy Mobile Internet Protocol.

20 Claims, 7 Drawing Sheets

(56) References Cited

U.S. PATENT DOCUMENTS

| | | | |
|---|---|---|---|
| 2007/0105549 | A1 | 5/2007 | Suda et al. |
| 2007/0189268 | A1 | 8/2007 | Mitra et al. |
| 2008/0008093 | A1 | 1/2008 | Wang et al. |
| 2008/0049787 | A1 | 2/2008 | McNaughton et al. |
| 2008/0144496 | A1 | 6/2008 | Bachmutsky |
| 2008/0144502 | A1 | 6/2008 | Jackowski et al. |
| 2009/0109922 | A1 | 4/2009 | Livanos |
| 2009/0268684 | A1 | 10/2009 | Lott et al. |
| 2009/0296599 | A1 | 12/2009 | Ayyagari et al. |
| 2010/0002722 | A1 | 1/2010 | Porat et al. |
| 2010/0246432 | A1 | 9/2010 | Zhang et al. |
| 2010/0322141 | A1 | 12/2010 | Liu et al. |
| 2011/0026453 | A1* | 2/2011 | Yan ............................... 370/328 |
| 2011/0098031 | A1 | 4/2011 | Dakshayani et al. |
| 2011/0098051 | A1 | 4/2011 | Kamalaraj et al. |
| 2011/0110286 | A1* | 5/2011 | Lu et al. ........................ 370/312 |
| 2011/0111767 | A1* | 5/2011 | Livanos .................... 455/452.2 |
| 2011/0117931 | A1 | 5/2011 | Hu et al. |
| 2011/0141884 | A1 | 6/2011 | Olsson et al. |
| 2011/0292870 | A1* | 12/2011 | Nagpal et al. ................. 370/328 |
| 2012/0026884 | A1 | 2/2012 | Sundell et al. |
| 2012/0047273 | A1* | 2/2012 | Ajero et al. ................... 709/228 |
| 2012/0269064 | A1 | 10/2012 | Strasman |
| 2013/0103833 | A1* | 4/2013 | Ringland et al. ............. 709/224 |

OTHER PUBLICATIONS

USPTO Oct. 9, 2013 Request for Continued Examination Response to Jul. 16, 2013 Final Office Action from U.S. Appl. No. 13/027,970.

USPTO Oct. 31, 2013 Non-Final Office Action from U.S. Appl. No. 13/027,970.

USPTO Sep. 10, 2013 Notice of Allowance from U.S. Appl. No. 13/027,999.

USPTO Aug. 13, 2013 Response to Jun. 18, 2013 Non-Final Office Action from U.S. Appl. No. 13/021,125.

USPTO Oct. 24, 2013 Final Office Action from U.S. Appl. No. 13/021,125.

Kent, et al., "Security Architecture for the Internet Protocol," Network Working Group, IETF RFC 2401; Nov. 1998.

USPTO Jun. 7, 2013 Response to Mar. 7, 2013 Non-Final Office Action from U.S. Appl. No. 13/027,970.

USPTO Jul. 16, 2013 Final Office Action from U.S. Appl. No. 13/027,970.

USPTO Jul. 2, 2013 Non-Final Office Action from U.S. Appl. No. 13/027,999.

USPTO Aug. 2, 2013 Response to Jul. 2, 2013 Non-Final Office Action from U.S. Appl. No. 13/027,999.

USPTO Jun. 7, 2013 Final Office Action from U.S. Appl. No. 13/104,788.

USPTO Jun. 18, 2013 Non-Final Office Action from U.S. Appl. No. 13/021,125.

USPTO Apr. 8, 2014 Final Office Action from U.S. Appl. No. 13/027,970.

USPTO May 9, 2014 Non-Final Office Action from U.S. Appl. No. 13/104,788.

U.S. Appl. No. 14/159,508, filed Jan. 21, 2014, entitled "System and Method for Managing Congestion in a Network Environment," Inventors: Francois L. Le Faucheur, et al.

USPTO Jan. 6, 2014 Notice of Allowance from U.S. Appl. No. 13/021,125.

ETSI, "LTE; General Packet Radio Service (GPRS) enhancements for Evolved Universal Terrestrial Radio Access Network (E-UTRAN) access (3GPP TS 23.401 version 9.6.0 Release 9)," © European Telecommunications Standards Institute 2010; 262 pages.

U.S. Appl. No. 13/591,069, filed Aug. 21, 2012, entitled "Providing Integrated End-to-End Architecture That Includes Quality of Service Transport for Tunneled Traffic," Inventors: Mark Grayson, et al.

USPTO Jan. 24, 2013 Non-Final Office Action from U.S. Appl. No. 13/104,788.

O'Dell, Mike, "8+8—An Alternate Addressing Architecture for IPv6," Network Working Group Internet Draft <draft-odell-8+8-00.txt> UUNET Technologies, Oct. 22, 1996, 21 pages.

Subharthi, Paul, et al., "A Vision of the Next Generation Internet: A Policy Oriented Perspective," Proceedings of British Computer Society (BCS) International Conference on Visions of Computer Science, Imperial College, Long, Sep. 22-24, 2008, 12 pages.

Zorn, G., et al., "RADIUS Attributes for Tunnel Protocol Support," Network Working Group RFC 2868, Jun. 2000, 21 pages.

"Data-over-Cable Service Interface Specifications DOCSIS 3.0; MAC and Upper Layer Protocols Interface Specification," Feb. 15, 2008.

USPTO Mar. 7, 2013 Non-Final Office Action from U.S. Appl. No. 13/027,970.

USPTO Apr. 16, 2013 Response to Non-Final Office Action dated Jan. 24, 2013 from U.S. Appl. No. 13/104,788.

U.S. Appl. No. 13/027,970, filed Feb. 15, 2011, entitled "System and Method for Synchronizing Quality of Service in a Wireless Network Environment," Inventors: Mark Grayson, et al.

U.S. Appl. No. 13/027,999, filed Feb. 15, 2011, entitled "System and Method for Managing Tracking Area Identity Lists in a Mobile Network Environment," Inventors: Vinod K. Kamalaraj, et al.

U.S. Appl. No. 13/021,125, filed Feb. 4, 2011, entitled "System and Method for Managing Congestion in a Network Environment," Inventors: Francois L. Le Faucheur, et al.

U.S. Appl. No. 13/104,788, filed May 10, 2011, entitled "System and Method for Integrated Quality of Service in a Wireless Network Environment," Inventors: Kevin D. Shatzkamer, et al.

P. Eardley, "Pre-Congestion Notification (PCN) Architecture," Network Working Group, RFC 5559, Jun. 2009, 51 pages; http://eprints.eemcs.utwente.nl/15444/01/rfc5559.txt.

Francois Le Faucheur, et al., "RSVP Extensions for Admission Control Over Diffserv Using Pre-Congestion Notification (PCN)," Internet Draft, © The Internet Society (2006), 11 pages; http://tools.ietf.org/pdf/draft-lefaucheur-rsvp-ecn-01.pdf.

Wayne Cutler, "MSF Whitepaper on Quality of Service (QoS) over the Network-to-Network Interface (NNI)—MSF-TR-Services-006.FINAL," MultiService Forum © 2010, 22 pages.

* cited by examiner

SYSTEM AND METHOD FOR SUBSCRIBER MOBILITY IN A CABLE NETWORK ENVIRONMENT

TECHNICAL FIELD

This specification relates in general to the field of communications, and more particularly, to a system and a method for subscriber mobility in a cable network environment.

BACKGROUND

Networking architectures have grown increasingly complex in communications environments, particularly mobile wireless environments. Cable operators are also steadily increasing their wireless service offerings, including 3G, WiFi, WiMAX, picocells, and femtocells: all of which can be linked to backhaul networks using the Data Over Cable Service Interface Specification (DOCSIS). However, many cable operators are unable to provide suitable mobility in such an environment, or are only able to provide such mobility with nested tunnels and with significantly increased packet overhead. Hence, significant challenges remain for enabling subscriber mobility in a cable architecture using an existing network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes creating (e.g., generating, establishing, provisioning, etc.) a service flow with an endpoint over a wireless link coupled to a backhaul. The service flow can include access to a network, access to a specific service, access to a particular location in the network, etc. The method can further include notifying (e.g., through any appropriate signaling mechanism) a mobility anchor of a location associated with the endpoint; relaying control packets between the endpoint and an access gateway; and relaying bearer packets between the endpoint and the mobility anchor, where the bearer packets are exchanged with the endpoint over a locally terminated bearer tunnel and the bearer packets are exchanged with the mobility anchor using Proxy Mobile Internet Protocol.

In more specific embodiments, the backhaul provides a DOCSIS link between a cable modem and a cable modem termination system. Additionally, the request can include a quality of service parameter, which is mapped to a DOCSIS quality of service class for the backhaul. In particular implementations, packets can be exchanged between a cable modem termination system and a home agent in a WiMAX network, and a care-of-address is sent in a router advertise message to the endpoint. In addition, the method can include assigning a subscriber policy profile to the endpoint, where the subscriber policy profile includes a quality of service parameter for the wireless link. In certain architectures, the backhaul is a hybrid fiber-coaxial backhaul.

Example Embodiments

Figure 1:
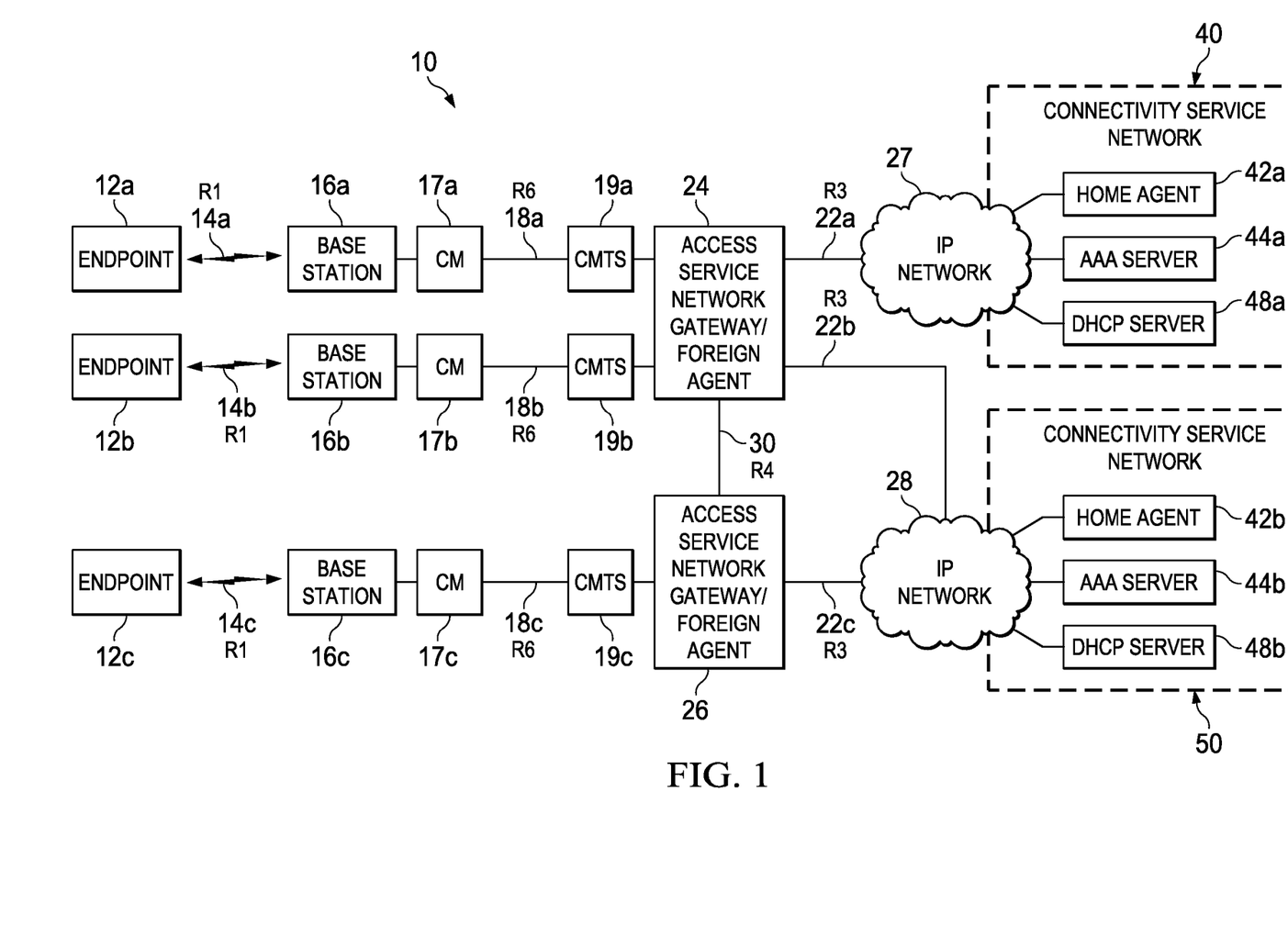
FIG. 1 is a simplified block diagram illustrating an example embodiment of a communication system in accordance with one embodiment of the present disclosure.

Turning to FIG. 1, FIG. 1 is a simplified block diagram of an example communication system 10 for providing subscriber mobility in a cable network environment. Communication system 10 may include endpoints 12a-12c, which are coupled to wireless access points, such as base stations 16a-16c, through interfaces 14a-14c (e.g., the R1 interface). Each base station (BS) 16a-16c may be integrated with or coupled to a cable modem (CM) 17a-17c, respectively. Cable modems 17a-17c may, in turn, be coupled to a cable modem termination system (CMTS) 19a-19c, respectively, through (for example) a series of interfaces 18a-18c (e.g., the R6 interface). Additionally, each CMTS 19a-19c can be coupled to a respective access gateway (AGW), such as an access service network (ASN) gateway/foreign agent (ASNGW/FA) 24 and 26.

Endpoints 12a-12c may be associated with subscribers, clients, or customers wishing to access communication system 10. The term 'endpoint' or 'node' may be inclusive of devices used to initiate a communication, such as a computer, any type of user equipment, any type of mobile station, any type of smart phone, a personal digital assistant (PDA), a laptop or electronic notebook, a cellular telephone, an iPhone, an iPad, a Google Android phone, an Internet Protocol (IP) phone, or any other device, component, element, or object capable of initiating voice, audio, or data exchanges within communication system 10. Endpoints 12a-12c may also be inclusive of a suitable interface to the human user, such as a microphone, a display, or a keyboard or other terminal equipment.

Endpoints 12a-12c may also be any device that seeks to initiate a communication on behalf of another entity or element, such as a program, a database, or any other component, device, element, or object capable of initiating a voice or a data exchange within communication system 10. Data, as used herein, refers to any type of numeric, voice, or script data, or any type of source or object code, or any other suitable information in any appropriate format that may be communicated from one point to another.

A wireless access point, such as a base station, is generally responsible for providing an air interface to a mobile endpoint. Additional functions that may be part of a base station can include micromobility management functions, such as handoff triggering and tunnel establishment, radio resource management, quality of service (QoS) policy enforcement, traffic classification, Dynamic Host Control Protocol (DHCP) proxy, key management, session management, and multicast group management.

ASNGW/FAs 24 and 26 are network elements that facilitate service flows between endpoints and a given network. An ASNGW typically acts as a Layer 2 traffic aggregation point within an ASN. Additional functions that may be part of the ASN gateway include intra-ASN location management and paging, radio resource management and admission control, caching of subscriber profiles and encryption keys, AAA client functionality, establishment and management of mobility tunnel with base stations, QoS and policy enforcement, foreign agent functionality for Mobile IP, and routing to a connectivity service network (CSN).

A CSN, in general, can provide IP connectivity and IP core network functions. For example, CSN 40 and CSN 50 may provide connectivity to other networks, such as the Internet, corporate networks, and mobile wireless networks. A CSN is usually owned by a network service provider (NSP), and may include home agents (e.g., home agents 42a-42b), authentication, authorization, and accounting (AAA) servers (e.g., AAA servers 44a-44b), and DHCP servers (e.g., DHCP servers 48a-48b). The CSN can also provide per user policy management of QoS and security. The CSN may also be responsible for IP address management, support for roaming between different NSPs, location management between ASNs, and mobility and roaming between ASNs.

An interface 30 (such as the R4 interface) may be provided between the gateways. A separate set of interfaces 22a-22c is also provided between the gateways and two different network service providers. For example, R3 interfaces 22a-22b may connect ASNGW/FA 24 to an IP network 27, and an R3 interface 22c can connect ASNGW/FA 26 to IP network 28. IP network 27 and IP network 28 may each be coupled to a respective CSN 40 and 50.

In one example embodiment, endpoints 12a-12c may be WiMAX mobile stations (MS), and base stations 16a-16c may be WiMAX base stations. Thus, the R1 interface may be a wireless interface between a WiMAX mobile station and a WiMAX base station, as generally defined by the IEEE 802.16d/e specification, which also specifies well-defined QoS policy parameters. The R6 interface standard may be defined by the WiMAX Forum Network Working Group (NWG). However, such an R6 interface standard does not generally define QoS behavior—it may be specified by a vendor's implementation. The R4 interface between two ASNGWs may be similar to the R6 interface in that it can be defined by the WiMAX NWG and it may lack QoS specifications. The R3 interface between ASNGWs and CSNs may also be defined by the WiMAX NWG. Typically, the CSN is where the service intelligence can reside.

For example, the AAA servers may include the service provisioning for each subscriber. The AAA servers can be provisioned with the R1 interface QoS policy parameters on each individual subscriber basis. The AAA's R1 QoS provisioning information can be fetched by the ASNGW and passed to the base station and endpoints for enforcement. However, the NWG specification does not, in general, cover the AAA provisioning for R6, R4, and R3 interfaces for the subscriber.

Note that before detailing specific operations and the infrastructure of FIG. 1, certain contextual information is provided to offer an overview of the types of communications traversing communication system 10, as well as detail problems that may be encountered with subscriber mobility in such an environment. Such information is offered earnestly and for teaching purposes only and, therefore, should not be construed in any way to limit the broad applications for the present disclosure.

Outdoor wireless networks have gained notoriety, with certain implementations having a wireless base station and a backhaul provided using a cable modem, which provides bi-directional data communication over a hybrid fiber-coaxial (HFC) infrastructure. For example, some networks may include WiFi, WiMAX, and Long Term Evolution (LTE) strand-mounted systems, which rely on a DOCSIS link over an HFC infrastructure. Other examples may include an integrated DOCSIS modem with multiple service set identifier (SSID) WiFi access points, and integrated DOCSIS modem and femtocell/picocell devices. However, these implementations generally provide no mobility, or provide mobility only with nested tunnels and significantly increased packet overhead, which can adversely affect the subscriber experience.

For example, if such a network does not provide mobility, a subscriber's IP session and related applications should be broken, and subsequently reestablished before communication can be resumed. Some mobile endpoints may support a client-based mobility strategy in which a mobile endpoint determines a co-located care-of address (COA) that can be used to update a binding at an assigned home agent. In such a strategy, the mobile endpoint (which contains a Mobile IP client) becomes responsible for initiating handoffs (in and out of femtocell coverage, for example), which is not a preferred approach for service providers. Moreover, with a co-located care-of address, a Mobile IP tunnel runs from a mobile endpoint to a home agent residing in either a cable operator domain or a third-party domain (usually a mobile operator), thereby incurring unnecessary overhead over the access network.

In yet another alternative, a mobile operator may be able to provide Layer 2 network-hosted mobility, in which the mobile operator handles mobility using standards-compliant tunneling protocols, such as Proxy Mobile IP (PMIP), General Packet Radio Service (GPRS) Tunneling Protocol (GTP), or Generic Routing Encapsulation (GRE) in a 3rd Generation Partnership Project (3GPP), 3GPP2, or WiMAX architecture. These tunnels may be further encapsulated using the IP Security (IPsec) protocol suite to overcome security issues over potentially untrusted networks. Both the standards-compliant tunneling protocol and the IPsec tunnel can extend from elements offering wireless access integrated with a cable modem, which then extend over the cable access towards one or more points in a third party domain. For example, IPsec and GTP/PMIP/GRE may be terminated on different entities in a third party domain.

Moreover, the radio technology (WiFi, WiMAX, 3G, etc.) in these types of deployments is designed to provide QoS for services such voice, video, or specific per-subscriber service tiers. However, these implementations do not address QoS over the backhaul. Rather, QoS requirements (and delivery mechanisms) are generally restricted to the air interface with no connections or tie-ins to QoS requirements (and delivery mechanisms) over the DOCSIS link. For example, over-the-air interface voice packets may be delivered with guaranteed bounds on delay, jitter, and packet loss. However, once these packets are sent to the backhaul, they generally compete with all other best effort traffic, and the over-the-air guaranteed bounds are not very useful if a DOCSIS link is allowed to introduce wide variations on such metrics. Upstream QoS across a DOCSIS link can become critical with multiple active devices each using less than the maximum pre-allocated backhaul bandwidth, but together causing congestion. Given these obstacles, providing guaranteed service over such systems remains challenging.

In accordance with embodiments disclosed herein, communication system 10 can overcome some of these shortcomings (and others) by leveraging DOCSIS technology in a cable operator domain to offer an authentication and control channel. Additionally, the architecture can offer tunneling over IP as a bearer channel for micromobility between a cable modem and the CMTS. Communication system 10 is also configured for providing PMIP as a control/bearer channel between the CMTS and a mobile access gateway, as further detailed below.

PMIP is a standardized network-based mobility management protocol. It can be used for building access technology independent of mobile core networks, accommodating various access technologies such as WiMAX, LTE, and wireless local area network (WLAN) based access architectures. PMIP defines two network entities that can be involved in mobility management: a local mobility anchor (LMA) and a mobile access gateway (MAG). A MAG can manage mobility-related signaling for a mobile endpoint that is attached to its access link. An LMA is the home agent for a mobile endpoint in a PMIP domain.

Network-based mobility management can enable the same functionality as Mobile IP without modifications to a host's TCP/IP stack. In using PMIP, the host (e.g., a mobile endpoint) can change its point-of-attachment to a network without changing its network address. Contrary to the Mobile IP approach, this functionality is implemented by the network, which is responsible for tracking the movements of the host and for initiating mobility signaling on its behalf.

In one particular embodiment of communication system 10, a mobile endpoint (e.g., a WiMAX mobile station) may attach to a base station integrated with (or linked to) a cable modem, which connects via DOCSIS to a CMTS. The CMTS may operate as a PMIP MAG and signal connectivity back to an LMA, such as a home agent. If a mobile endpoint moves outside the range of the base station, a new MAG in the macro network can establish communication with the endpoint and update the LMA accordingly. The PMIP domain can reside between the CMTS and the LMA. Thus, the endpoint can be established as a mobile node, but it is not required to participate in IP-related mobility signaling. The CMTS address may also be the MAG address.

In another example embodiment, a MAG may assign a subscriber policy profile to a mobile endpoint. The policy profile may include an access link QoS, and the CMTS may be responsible for mapping IP-based QoS to DOCSIS priority levels. In yet another embodiment, an endpoint may be authenticated to access both a DOCSIS domain and a Mobile IP domain. Similar to the Baseline Privacy Interface (BPI) for service protection in DOCSIS, a CMTS can use a subscriber Media Access Control (MAC) address received through DOCSIS to build a PMIP registration request to a MAG. The MAG may use this information for RADIUS, DIAMETER, TACACS, etc. based authentication of the subscriber, for example.

Figure 2A:
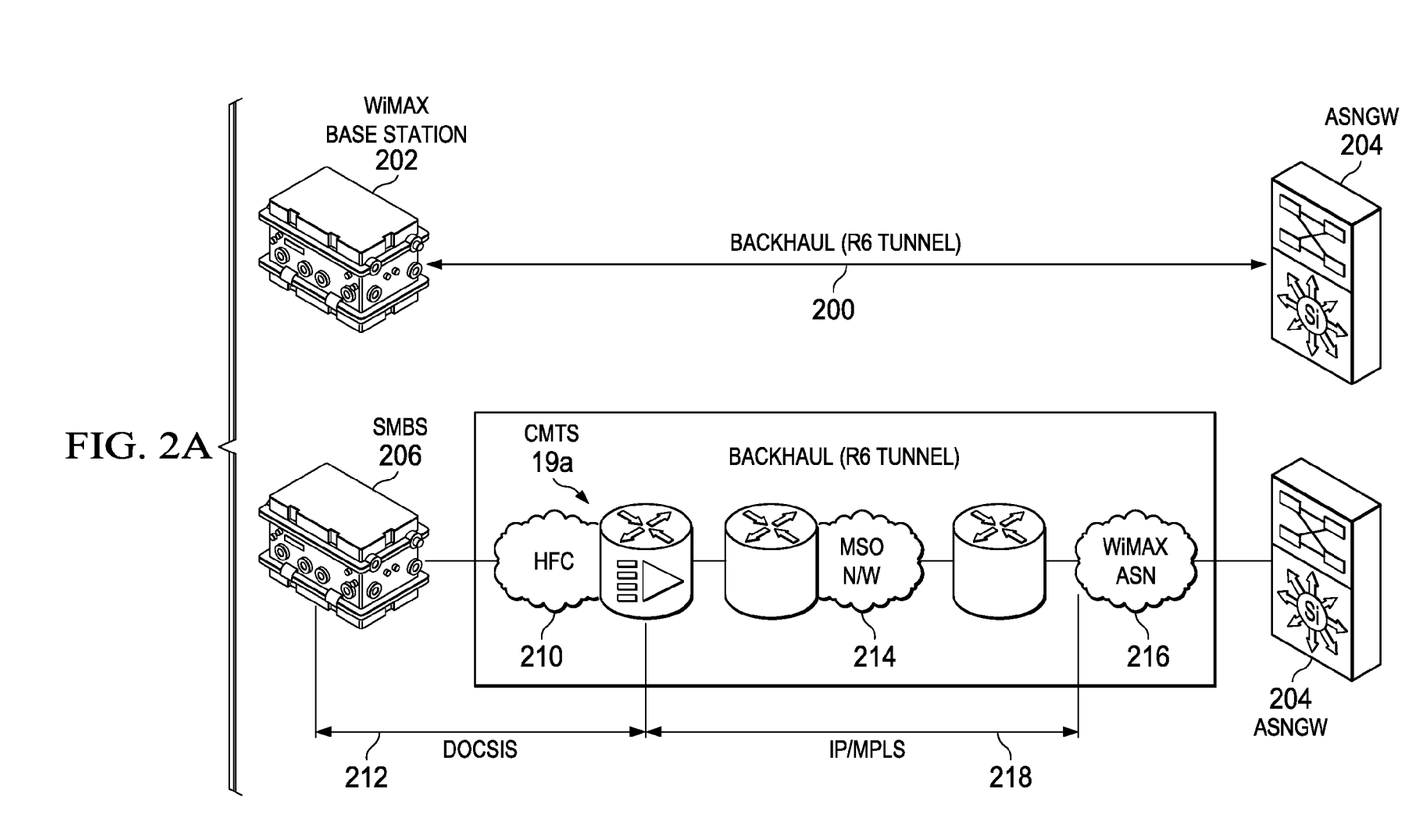
FIG. 2A is a simplified block diagram of an example embodiment of a communication system having a WiMAX network in accordance with one embodiment of the present disclosure.

Turning to FIG. 2A, FIG. 2A is a simplified block diagram of an example embodiment of communication system 10 operating in conjunction with a WiMAX network. FIG. 2A includes an exploded view of a backhaul 200 between a WiMAX base station 202 and an ASNGW 204, in which base station 202 is implemented as a strand-mounted base station (SMBS) 206 that is integrated with a cable modem. Although SMBS 206 may be associated with any of cable modems 17a-17c, cable modem 17a is used in the following description for illustrative expedience. SMBS 206 may be connected to CMTS 19a through an HFC infrastructure 210 using a DOCSIS link 212. Multiple System Operator (MSO) network 214 connects CMTS 19a to a WiMAX ASN 216 over an IP/Multiprotocol Label Switching (IP/MPLS) link 218, which may be connected to ASNGW 204.

Figure 2B:
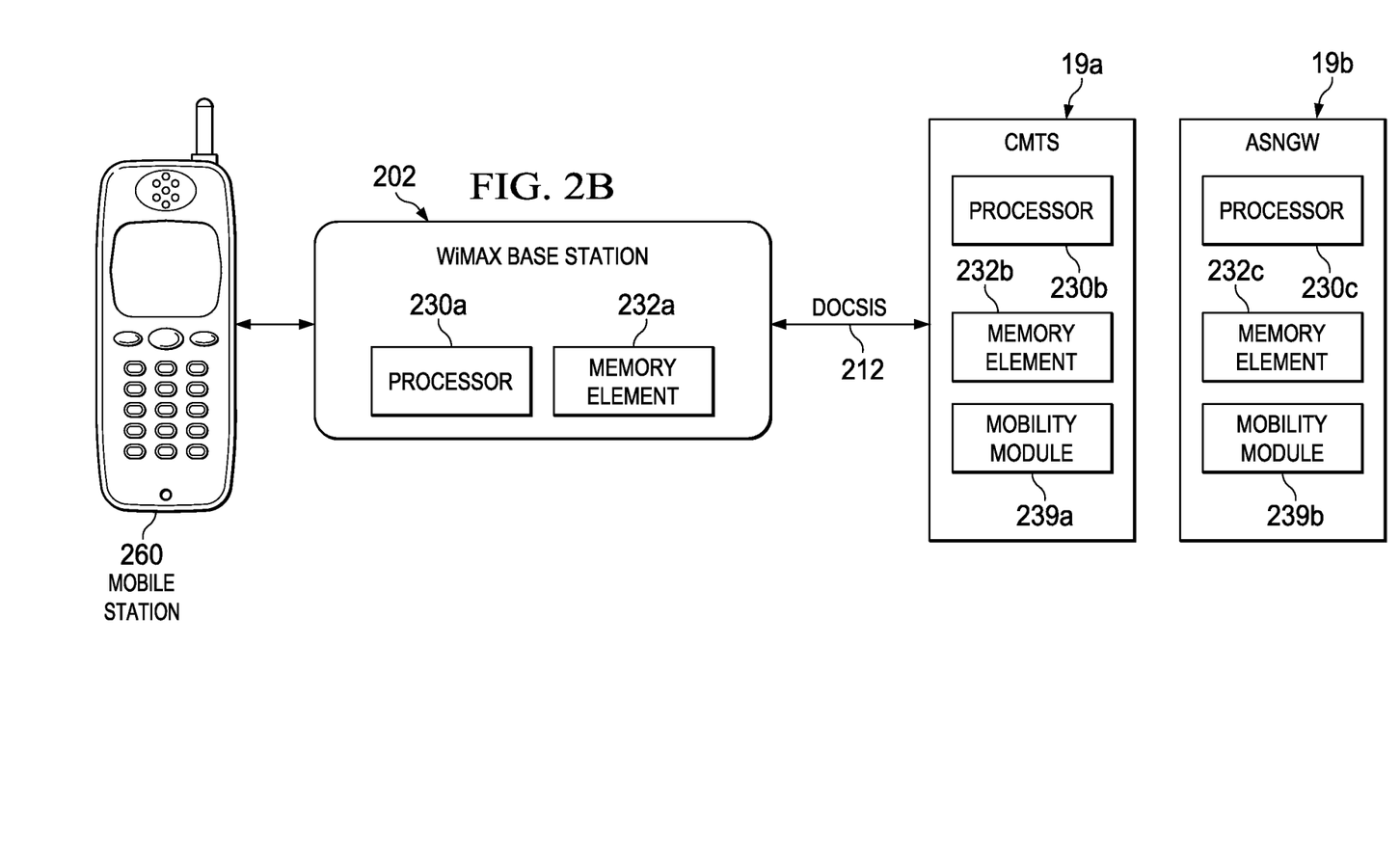
FIG. 2B is a simplified block diagram illustrating additional details that may be associated with the communication system.

FIG. 2B is a simplified block diagram illustrating additional details that may be associated with one potential embodiment of communication system 10 associated with a WiMAX network. FIG. 2B includes base station 202, CMTS 19a, and ASNGW 204. Base station 202, CMTS 19a, and ASNGW 204 may each include a respective processor 230a-230c and a respective memory element 232a-232c. Moreover, CMTS 19a and ASNGW may each include software elements, such as mobility modules 239a-239b. Hence, appropriate software and/or hardware may be provisioned in base station 202, CMTS 19a, and/or ASNGW 204 to facilitate the activities discussed herein. Also depicted in FIG. 2B is a mobile station 260 (reflective of a type of endpoint), which can attach to base station 202 to establish a communication session.

In one example implementation, base station 202, CMTS 19a, and ASNGW 204 are network elements, which are meant to encompass network appliances, servers, routers, switches, gateways, bridges, loadbalancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In regards to the internal structure associated with communication system 10, each of base station 202, CMTS 19a, and ASNGW 204 can include memory elements (as shown in FIG. 2B) for storing information to be used in achieving the mobility management operations, as outlined herein. Additionally, each of these devices may include a processor that can execute software or an algorithm to perform the activities discussed herein. These devices may further keep information in any suitable memory element (e.g., random access memory (RAM), read only memory (ROM), an erasable programmable read only memory (EPROM), application specific integrated circuit (ASIC), etc.), software, hardware, or in any other suitable component, device, element, or object where appropriate and based on particular needs. Any of the memory items discussed herein should be construed as being encompassed within the broad term 'memory element.' The information being tracked or sent by base station 202, CMTS 19a, and ASNGW 204 could be provided in any database, queue, cache, register, control list, tree, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network elements and endpoints (e.g., user equipment, mobile nodes, etc.) can also include suitable interfaces for receiving, transmitting, and/or otherwise communicating data or information in a network environment.

In one example implementation, base station 202, CMTS 19a, and/or ASNGW 204 may include software to achieve, or to foster, operations outlined herein. In other embodiments, these operations may be provided externally to these elements, or included in some other network device to achieve this intended functionality. Alternatively, these elements include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Note that in certain example implementations, functions outlined herein may be implemented by logic encoded in one or more tangible media (e.g., embedded logic provided in an ASIC, in DSP instructions, software (potentially inclusive of object code and source code) to be executed by a processor, or other similar machine, etc.). In some of these instances, memory elements (as shown in FIG. 2B) can store data used for the operations described herein. This includes the memory elements being able to store software, logic, code, or processor instructions that are executed to carry out the activities described herein. A processor can execute any type of instructions associated with the data to achieve the operations detailed herein. In one example, the processors (as shown in FIG. 2B) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 3:
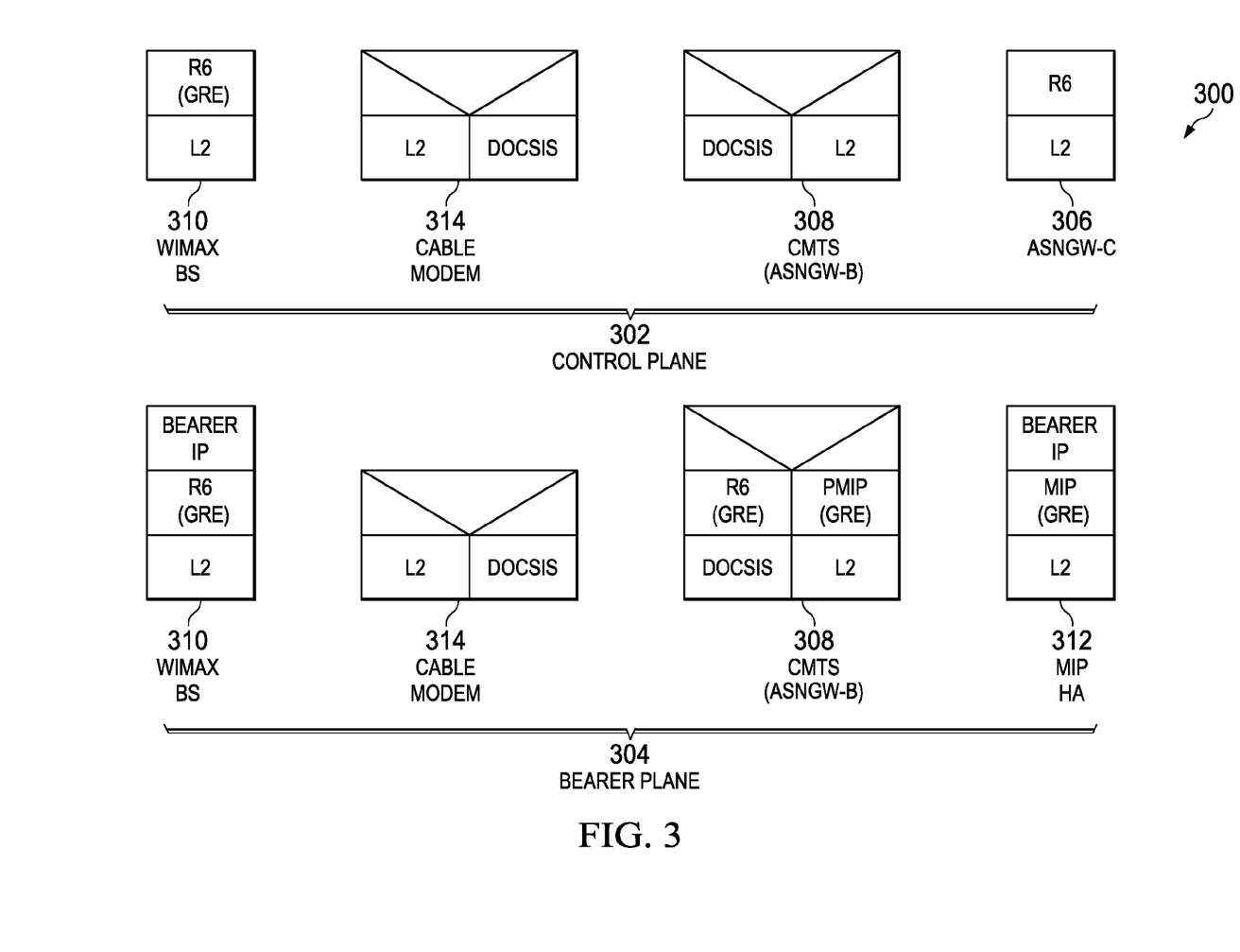
FIG. 3 is a protocol diagram illustrating signal mechanisms in an example embodiment of the communication system.

Turning to FIG. 3, FIG. 3 is a protocol diagram 300 illustrating signal mechanisms in an example embodiment of communication system 10 associated with a WiMAX network. FIG. 3 includes a control plane 302, a bearer plane 304, an ASNGW-C 306, a CMTS 308, a WiMAX base station 310, a Mobile IP home agent (HA) 312, and a cable modem 314. The WiMAX ASNGW functionality can be split into control plane 302 and bearer plane 304 in a particular implementation. Radio control plane signaling may be forwarded to ASNGW-C 306 with CMTS 308 operating as a relay/proxy. [Note that the term 'relay' as used herein in this Specification is a broad term that encompasses any type of proxying, passthrough, systematic data propagation, simple or complex data exchanges, network address translation (NAT), and/or receive/send activity, more generally.]

In alternative embodiments, signaling may be terminated locally at a CMTS with a new interface between the CMTS and an ASNGW. In bearer plane 304, CMTS 308 may host the bearer function of the ASNGW (i.e., ASNGW-B). Thus, the bearer tunnel from a mobile endpoint and base station can be terminated locally. An R3 interface (from CMTS 308) may be used to interface with a home agent in a CSN.

Figure 4:
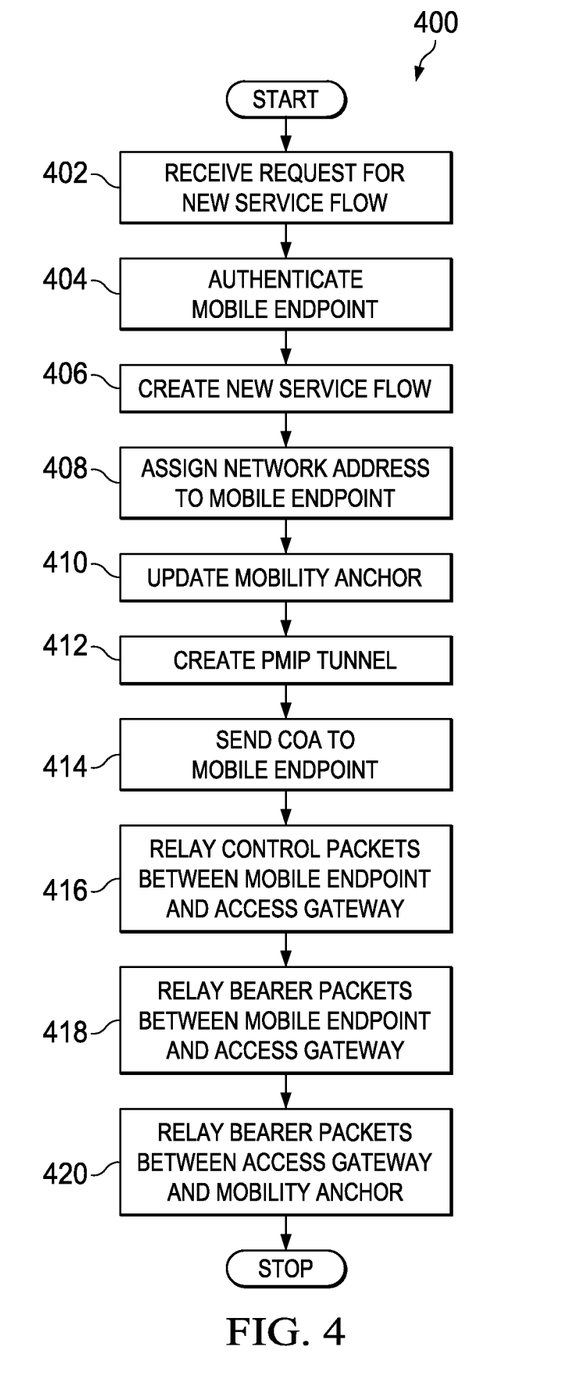
FIG. 4 is a simplified flowchart illustrating potential operations that may be associated with an example embodiment of the communication system.

FIG. 4 is a simplified flowchart 400 illustrating potential operations that may be associated with an example embodiment of communication system 10. In certain embodiments, the mobility operations discussed herein may be executed by mobility module 239a and/or mobility module 239b, for example. At 402, a new service flow may be requested by a mobile endpoint upon entering a mobile domain. The request may be sent over a wireless link to an access point, such as a WiMAX base station, and relayed through a cable modem to a CMTS over an HFC backhaul. The mobile endpoint may be authenticated at 404. If properly authenticated, a new service flow can be created (e.g., generated, established, provisioned, etc.) at 406, and a network address is assigned to the mobile endpoint at 408. A mobility anchor may be updated with the location of the mobile endpoint at 410. For example, the location of the mobile endpoint may be signaled to a home agent in a WiMAX network.

At 412, a PMIP tunnel may be created between an access gateway and the mobility anchor. Thus, in embodiments where the CMTS may host the bearer function of an access gateway (e.g., an ASNGW), a PMIP tunnel may be created between the CMTS and a home agent in a WiMAX network using an R3 interface, for example. At 414, a care-of-address can be sent (e.g., in a router advertise message) to the mobile endpoint. Control plane packets can then be relayed between the mobile endpoint and an access gateway over a locally terminated bearer tunnel at 416. At 418, bearer packets can be relayed between the mobile endpoint and an access gateway over a tunnel terminated locally at the access gateway (e.g., in a CMTS hosting the bearer function of an ASNGW). At 420, bearer packets can be relayed between the access gateway and the mobility anchor over the PMIP tunnel.

Figure 5:
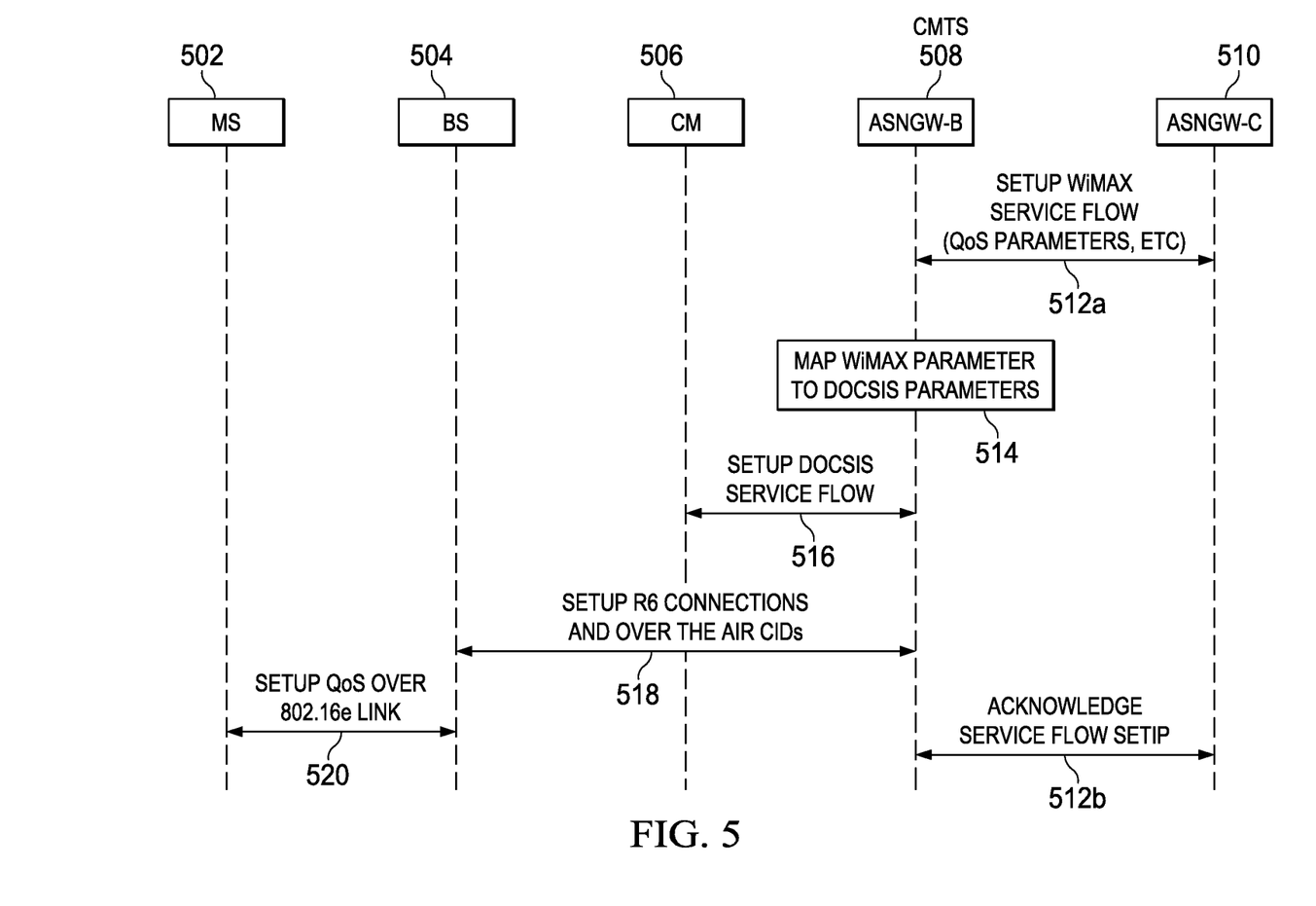
FIG. 5 is a simplified sequence diagram illustrating potential operations in an example embodiment of communication system.

FIG. 5 is a simplified sequence diagram 500 illustrating potential operations in an example embodiment of communication system 10 associated with a WiMAX network. Coupling CMTS 308 with the bearer function of ASNGW (as illustrated in FIG. 3) can enable integration of DOCSIS policy and QoS with user/WiMAX policy and QoS. Thus, for example, a DOCSIS service flow may be set up at the same time as WiMAX service flows for each individual user, as illustrated in FIG. 5.

FIG. 5 includes a mobile endpoint 502, a base station 504, a cable modem 506, a CMTS 508, and an ASNGW-C 510. CMTS 508 may host the bearer function of an ASNGW (ASNGW-B). At 512a, a WiMAX service flow may be established between CMTS 508 and ASNGW-C 510, which may include QoS parameters, etc. WiMAX parameters can be mapped to DOCSIS parameters at 514, and a DOCSIS service flow setup between CMTS 508 and cable modem 506 at 516. R6 connections and over-the-air connection identifiers (CIDs) may be setup between CMTS 508 and base station 504 at 518. At 520, QoS may be setup between base station 504 and mobile endpoint 502 over an 802.16e link, for example. Lastly, service flow setup may be acknowledged at 512b.

Thus, communication system 10 can enable subscriber mobility in a cable architecture using an existing DOCSIS network: transforming a cable network into a true visited mobile network. Communication system 10 can provide significant advantages over other approaches. For example, a mechanism that uses a nested-tunnel approach encapsulates existing traffic (typically GRE-based) from a base station again in IPsec to a third-party operator domain, which can create significant packet overhead, particularly for Voice over IP (VoIP) traffic. Overhead of IPsec and GRE can be as much as 100% of the bearer payload. However, communication system 10 does not require nested tunnels from a base station (e.g., WiMAX strand-mounted picocell, WiFi hotspot, femtocell, etc.), which can substantially reduce packet overhead. A client mobile IP approach with co-located care-of address also incurs significant over-the-air overhead, especially for VoIP, since such an approach requires an MIP tunnel to originate in a mobile endpoint. Thus, communication system 10 can significantly reduce over-the-air packet overhead in comparison to a client mobile IP approach.

Another significant advantage of communication system 10 is that a MAG can enforce policy profile over a DOCSIS backhaul network. Communication system 10 also eliminates any requirement that a mobile endpoint participate in any mobility-related signaling. Moreover, communication system 10 can provide selective IP traffic offload in a cable regional network. For instance, there may be some bearer IP flows that do not require mobility between picocells (on a DOCSIS backhaul) and macro base stations. Such flows could be offloaded at the CMTS (ASNGW-B), which can enable more efficient traffic routing (such local breakout may use network address and port translation at the ASNGW-B). Communication system 10 can also enable service providers to guarantee quality of experience through a DOCSIS network, and allow a cable operator to integrate existing protocols and infrastructure as a mechanism to provide micromobility-level signaling.

Figure 6:
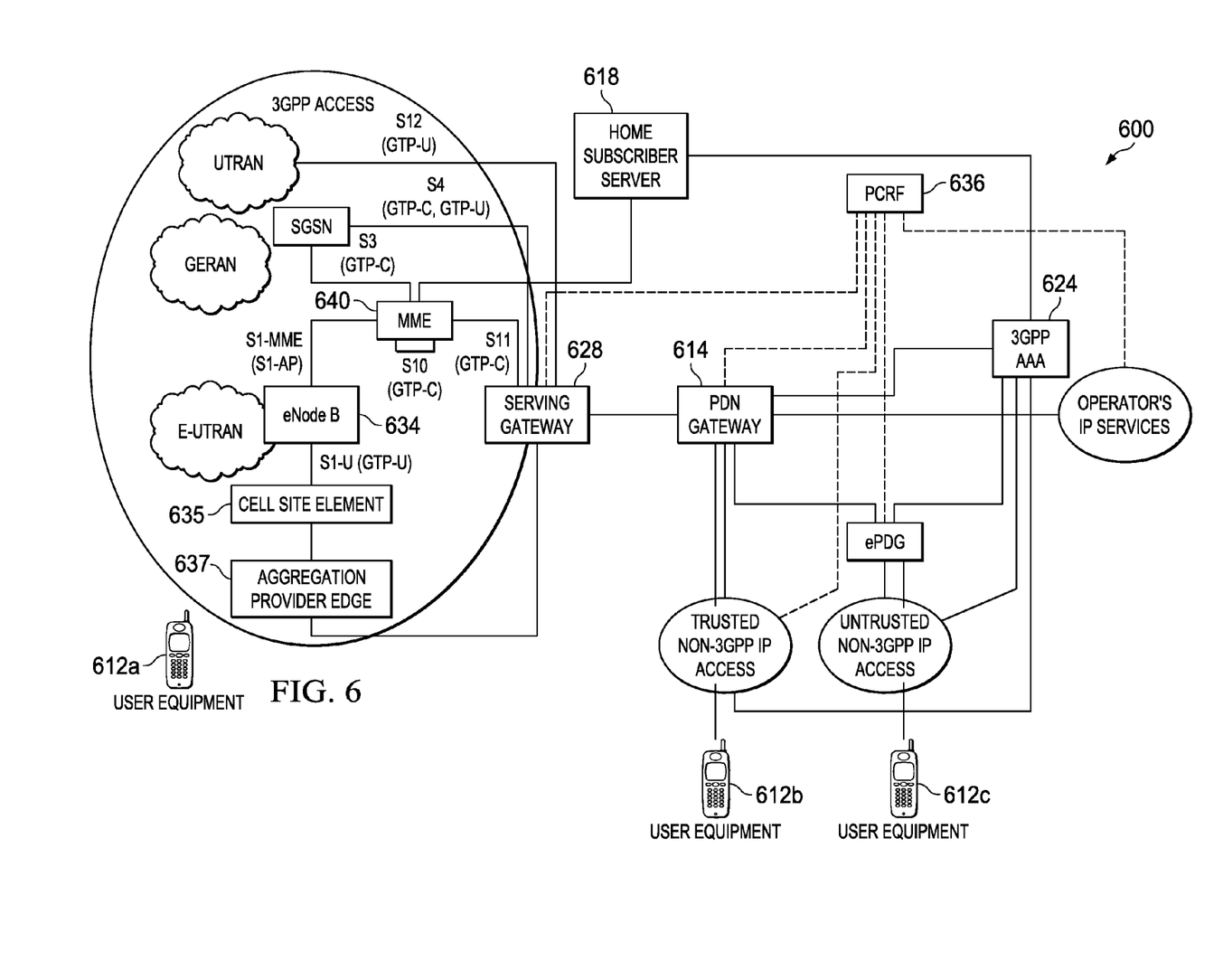
FIG. 6 is a simplified block diagram illustrating an alternative embodiment of the communication system in accordance with one embodiment of the present disclosure.

FIG. 6 is a simplified block diagram of an example embodiment of communication system 10 that may be tied to the 3rd Generation Partnership Project (3GPP) Evolved Packet System (EPS) architecture (also sometimes referred to as the LTE EPS architecture). The example architecture of FIG. 6 includes multiple end users operating user equipment (UE) 612*a-c* and a packet data network (PDN) gateway (PGW) 614, which has a logical connection to a serving gateway (SGW) 628. Also provided is a home subscriber server (HSS) 618 and an Authentication, Authorization, and Accounting (AAA) element 624. SGW 628 has a logical connection to an eNodeB 634, a cell site element 635, an aggregation provider element (Agg-PE) 637, and a Mobility Management Entity (MME) 640. Both SGW 628 and PGW 614 can interface with a Policy and Charging Rules Function (PCRF) 636.

In more general terms, 3GPP defines EPS as specified in TS 23.401, TS.23.402, TS 23.203, etc. The EPS generally consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks is done via the evolved packet data gateway (ePDG), which provides for IPsec security associations to the user equipment over the untrusted IP access network. The ePDG (in turn) supports mobility, policy, and AAA interfaces to the EPC, similar to the trusted IP access networks.

The EPC generally comprises an MME, an SGW, a PGW, and a PCRF. The MME is the primary control element for the EPC. Among other things, the MME provides tracking area list management, idle mode UE tracking, bearer activation and deactivation, SGW and PGW selection for UEs, and authentication services. The SGW is a data plane element that can manage user mobility and interfaces with RANs. The SGW also can maintain the data paths between eNodeBs and the PGW, and serves as a mobility anchor when UEs move across areas served by different eNodeBs. The PGW provides connectivity for UEs to external packet data networks. The PCRF detects service flows and enforces charging policies.

RANs in an LTE architecture consist of eNodeBs (also known as eNBs). An eNodeB is generally connected directly to an EPC, as well as to adjacent eNodeBs. Connections with adjacent eNodeBs allow many calls to be routed more directly, often with minimal or no interaction with an EPC. An eNodeB is also responsible for selecting an MME for UEs, managing radio resources, and making handover decisions for UEs.

In operation, UE 612*a* can attach to the network for purposes of establishing a communication session. UE 612*a* can communicate with eNodeB 634, which can further interact with MME 640 to complete some form of authentication for a particular user. MME 40 can interact with SGW 628, which interacts with PGW 614 such that a session is being setup between these components. Tunnels could be established at this juncture, and a suitable IP address would also be issued for this particular user. This process generally involves a default EPS bearer being created for UE 612*a*. As the session is established, PGW 614 can interact with PCRF 636 to identify policies associated with this particular user, such as a certain QoS setting, bandwidth parameter, latency setting, priority, billing, etc.

Thus, in an LTE network, user equipment may be analogous to a mobile endpoint as described above, while an SGW may be analogous to an ASNGW in a WiMAX network, and an eNodeB may be analogous to a WiMAX base station. In certain embodiments of communication system 10, an eNodeB can be implemented with a picocell, which may be connected to a CMTS through an HFC infrastructure using a DOCSIS link. A Multiple System Operator (MSO) network can connect a CMTS to an EPC over an IP/Multiprotocol Label Switching (MPLS) link, and the EPC can connect the CMTS to an MME.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a module is provided within the network elements, these elements can be provided externally, or consolidated and/or combined in any suitable fashion. In certain instances, certain elements may be provided in a single proprietary module, device, unit, etc.

It should be noted that, although the present disclosure has been described in detail with reference to particular arrangements and configurations, these example configurations and arrangements may be changed significantly without departing from the scope of the present disclosure. Moreover, although communication system 10 has been illustrated with reference to particular elements and operations that facilitate the communication process, these elements and operations may be replaced by any suitable architecture or process that achieves the intended functionality of communication system 10. For example, while certain embodiments have been described herein in terms of a WiMAX network, the principles illustrated herein are equally applicable (and have direct applications) to other wireless networks, including LTE, WiFi, 3G, femto architectures, pico architectures, etc. Hence, any of the aforementioned activities and mechanisms discussed can readily be implemented in any other wireless networks identified above.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    creating a service flow with an endpoint over a wireless link coupled to a Data Over Cable Service Interface Specification (DOCSIS) backhaul network;
    notifying a mobility anchor of a location associated with the endpoint;
    creating a Proxy Mobile Internet Protocol (PMIP) tunnel between an access gateway and the mobility anchor;
    relaying control packets between the endpoint and the access gateway over a bearer tunnel locally terminated at the access gateway;
    relaying bearer packets between the endpoint and the access gateway over the locally terminated bearer tunnel; and
    relaying bearer packets between the access gateway and the mobility anchor over the PMIP tunnel.

2. The method of claim 1, wherein the DOCSIS backhaul network provides a DOCSIS link between a cable modem and a cable modem termination system.

3. The method of claim 1, wherein a request for the service flow includes a quality of service parameter, which is mapped to a DOCSIS quality of service class for the DOCSIS backhaul network.

4. The method of claim 1, wherein packets are exchanged between a cable modem termination system and a home agent in a WiMAX network, and wherein a care-of-address is sent in a router advertise message to the endpoint.

5. The method of claim 1, further comprising:
    assigning a subscriber policy profile to the endpoint, wherein the subscriber policy profile includes a quality of service parameter for the wireless link.

6. The method of claim 1, wherein the DOCSIS backhaul network provides a DOCSIS link over a hybrid fiber-coaxial (HFC) infrastructure.

7. The method of claim 1, further comprising:
    mapping a quality of service parameter to a quality of service class for a DOCSIS link provided by the DOCSIS backhaul network, wherein the DOCSIS link couples a cable modem and a cable modem termination system.

8. Logic encoded in one or more non-transitory media that includes code for execution and when executed by a processor operable to perform operations comprising:
    creating a service flow with an endpoint over a wireless link coupled to a Data Over Cable Service Interface Specification (DOCSIS) backhaul network;
    notifying a mobility anchor of a location associated with the endpoint;
    creating a Proxy Mobile Internet Protocol (PMIP) tunnel between an access gateway and the mobility anchor;
    relaying control packets between the endpoint and the access gateway over a bearer tunnel locally terminated at the access gateway;
    relaying bearer packets between the endpoint and the access gateway over the locally terminated bearer tunnel; and
    relaying bearer packets between the access gateway and the mobility anchor over the PMIP tunnel.

9. The logic of claim 8, wherein the DOCSIS backhaul network provides a DOCSIS link between a cable modem and a cable modem termination system.

10. The logic of claim 8, wherein a request for the service flow includes a quality of service parameter, which is mapped to a DOCSIS quality of service class for the DOCSIS backhaul network.

11. The logic of claim 8, wherein packets are exchanged between a cable modem termination system and a home agent in a WiMAX network, and wherein a care-of-address is sent in a router advertise message to the endpoint.

12. The logic of claim 8, the operations further comprising:
    assigning a subscriber policy profile to the endpoint, wherein the subscriber policy profile includes a quality of service parameter for the wireless link.

13. The logic of claim 8, wherein the DOCSIS backhaul network provides a DOCSIS link over a hybrid fiber-coaxial (HFC) infrastructure.

14. The logic of claim 8, the operations further comprising:
    mapping a quality of service parameter to a quality of service class for a DOCSIS link provided by the DOCSIS backhaul network, wherein the DOCSIS link couples a cable modem and a cable modem termination system.

15. An apparatus, comprising:
    a memory element configured to store electronic code;
    a processor operable to execute instructions associated with the electronic code; and
    a mobility module coupled to the memory element and the processor, wherein the apparatus is configured for:
        creating a service flow with an endpoint over a wireless link coupled to a Data Over Cable Service Interface Specification (DOCSIS) backhaul network;
        notifying a mobility anchor of a location associated with the endpoint;
        creating a Proxy Mobile Internet Protocol (PMIP) tunnel between an access gateway and the mobility anchor;
        relaying control packets between the endpoint and the access gateway over a bearer tunnel locally terminated at the access gateway;
        relaying bearer packets between the endpoint and the access gateway over the locally terminated bearer tunnel; and
        relaying bearer packets between the access gateway and the mobility anchor over the PMIP tunnel.

16. The apparatus of claim 15, wherein the DOCSIS backhaul network provides a DOCSIS link between a cable modem and a cable modem termination system.

17. The apparatus of claim 15, wherein a request for the service flow includes a quality of service parameter, which is mapped to a DOCSIS quality of service class for the DOCSIS backhaul network.

18. The apparatus of claim 15, wherein packets are exchanged between a cable modem termination system and a home agent in a WiMAX network, and wherein a care-of-address is sent in a router advertise message to the endpoint.

19. The apparatus of claim 15, wherein the apparatus is further configured for:
   assigning a subscriber policy profile to the endpoint, wherein the subscriber policy profile includes a quality of service parameter for the wireless link.

20. The apparatus of claim 15, wherein the backhaul is a hybrid fiber-coaxial backhaul, and the apparatus is further configured for:
   mapping a quality of service parameter to a quality of service class for a DOCSIS link provided by the DOCSIS backhaul network, wherein the DOCSIS link couples a cable modem and a cable modem termination system.

* * * * *